L. E. Hopkins.
Felting Machine.
No. 15,375. Patented July 22, 1856.
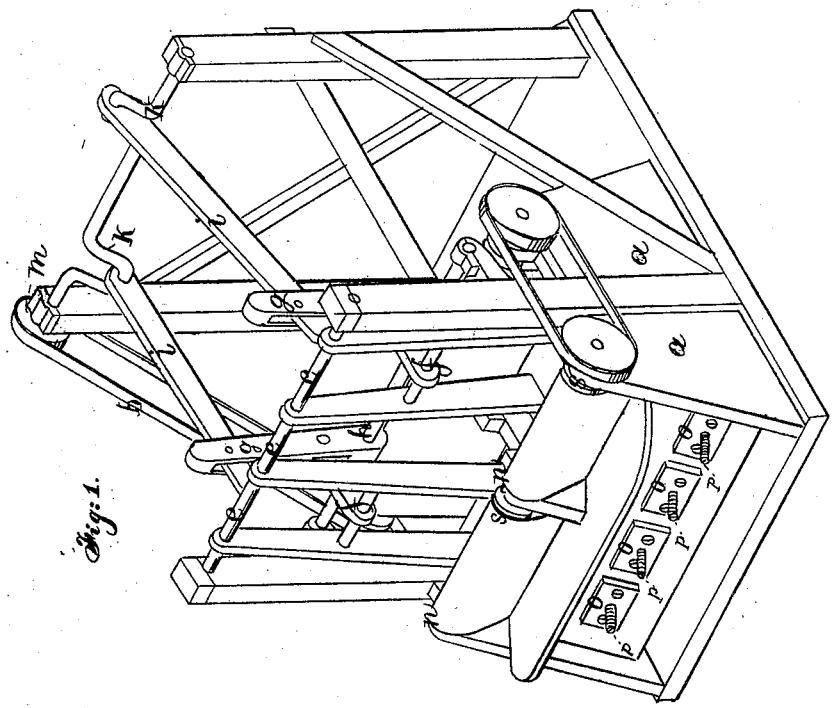
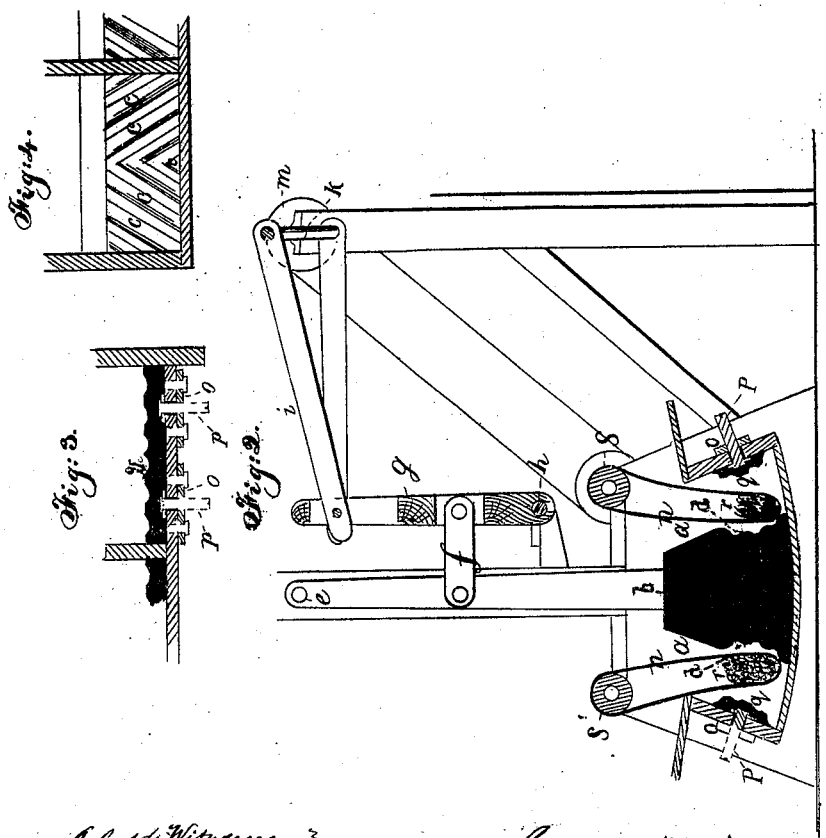
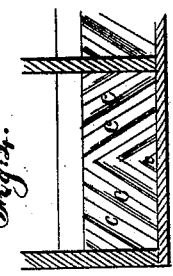
Lansing E. Hopkins

UNITED STATES PATENT OFFICE.

LANSING E. HOPKINS, OF BROOKLYN, NEW YORK.

MACHINE FOR FELTING HAT-BODIES.

Specification of Letters Patent No. 15,375, dated July 22, 1856.

*To all whom it may concern:*

Be it known that I, LANSING E. HOPKINS, of Brooklyn, in the county of Kings and State of New York, have invented a new and useful Machine for the Purpose of Sizing or Felting Hats; and I do hereby declare the following to be a full, clear, and exact description of the same, reference being had to the annexed drawings, Figure I being a perspective view, Fig. II a longitudinal section, Fig. III a transverse section, of the adjustable beater-front; Fig. IV, a front or face view of the same.

The same reference always denotes the same part in all the figures of the drawings.

To enable others skilled in the art, to make and use my invention, I will proceed to describe its construction, and operation. I construct a tub or vat. This tub will be known as (a) in the drawings. Within this tub (a) is a vibrating beater (b) with its two sides slightly hollowed and its face corrugated as shown in Fig. IV, at (c) and partly shown in Fig. II, where it may be known as (d). This beater is hung upon a shaft (its fulcrum), near the top (e); it is also connected by means of a connecting rod (f) to the rocking-lever (g) having its fulcrum at (h). At or near its top or opposite end is the second connecting-rod (i) which being attached to the crank (k) is there to receive its motion from said crank. A pulley upon the main shaft, by means of a belt (l) gives motion to a pulley on said crank (m). Power being thus communicated the crank revolves and through the above named parts causes the beater to vibrate on its axis to and fro.

The box, tub or vat may be in one or more compartments, but the drawings, here shown, represent four in one machine, with two sets of arrangement throughout; and each beater has its two opposite sides arranged so that each will alternately beat against the revolving apron (n) into which the hats are placed, so that they will, by the continued onward motion of the apron always be changing their position, and receive the beating while the machine is in operation.

At either side, opposite the beater and connected with the sides of the tub, are the adjustable plates or beater heads, corrugated in a manner similar to the sides of the beater itself; these are adjustable so that the space between them and the beater may be increased or decreased at will; and for this purpose I have arranged nuts as (O) Figs. I, II, III, permanently fixed, and through these I pass and operate the adjusting screws (p,) these being properly secured to the beater heads (q) see Figs. II, III. When I have more hats I enlarge the chamber, by adjusting the beater head; when fewer I make it smaller by the same means. The same remark will apply to the earlier or later working of the same batch of hats as they are larger and fuller when the sizing is commenced and get less in size as the work progresses, so that the beater always having the same amount of motion by this regulation of the beater heads is brought to impinge equally on a large or small body or number of hats.

The body of hats will be seen at (r) Fig. II. Other forms of beater-head and beater may be used to advantage, or perhaps may be found preferable.

Having thus given the different parts in detail, I will state that a quantity of hats, from one to six dozen are rolled up and in mass placed in a bag. This is for the more conveniently withdrawing them when it is desirable to do so. This is then placed in the interior of the apron (see r, Fig. II) and by the revolution of the roller or cylinder (s) the apron revolves and keeps the bag of hats constantly revolving.

Operation: I shall suppose a bag of hats kept properly moistened in each compartment of the machine, when by giving motion to the machine the beater vibrates coming with some considerable force against the apron containing the bags of hats meeting one at each side and forcing them back against the beater fronts or heads, before referred to. This motion is received from the main belt as before stated, the crank causing the vibration of the beater as it revolves. When the work has, in the judgment of the operator, proceeded far enough to require it he will withdraw the bags and then rearrange and croze them in the usual manner; after which the operations will be repeated until the hats are fully felted and brought by the pulling to the proper size.

Having thus fully described my improved machine for agitating and beating articles of wool, fur &c. in the process of felting, what I claim therein as new, and desire to secure by Letters Patent is—

1. The combination of the beaters, the revolving belt, and the beater heads operating substantially as described.

2. I claim the adjustability of the beater heads, in combination with beaters having a positive motion, substantially as shown.

LANSING E. HOPKINS.

Witnesses:
J. L. KINGSLEY,
JOHN WATSON.